United States Patent
Schwarz

[15] 3,654,689
[45] Apr. 11, 1972

[54] METHOD AND APPARATUS OF ASSEMBLING AND DISASSEMBLING HYDRAULIC DISC BRAKE CALIPERS

[72] Inventor: Maurice L. Schwarz, Middletown, Conn.

[73] Assignee: The EIS Automotive Corporation, Middletown, Conn.

[22] Filed: June 3, 1970

[21] Appl. No.: 42,961

[52] U.S. Cl. ............................29/427, 29/252, 29/200 D, 29/401, 188/72.5
[51] Int. Cl. ........................................................B23p 19/02
[58] Field of Search ........................29/427, 401, 252, 200 D; 188/72.5

[56] References Cited

UNITED STATES PATENTS

| | | | |
|---|---|---|---|
| 1,883,662 | 10/1932 | Fisher | 29/427 |
| 2,033,906 | 3/1936 | Adler | 29/252 X |
| 2,234,819 | 3/1941 | Butcher | 29/200 D UX |
| 2,439,692 | 4/1948 | McKay | 29/427 X |
| 2,557,619 | 6/1951 | Swart | 29/427 X |
| 3,058,207 | 10/1062 | Wilson | 29/252 UX |
| 3,137,060 | 6/1964 | Granzer et al. | 29/200 D |
| 3,413,709 | 12/1968 | Scobel et al. | 29/427 |

*Primary Examiner*—Charlie T. Moon
*Attorney*—McCormick, Paulding and Huber

[57] ABSTRACT

A method and apparatus for releasing frozen pistons from a disc brake caliper assembly by removing said assembly from a vehicle, removing the brake pads therefrom and placing it on a work table. The work table has a self-contained hydraulic system and a vacuum line is also provided. A spacer block of predetermined thickness is placed between the opposed pistons, and a pressure line connected to the caliper assembly. A hand pump is used to increase system pressure until all the hydraulic pistons, including any frozen pistons, move out of their bores to engage the spacer block. The hydraulic pressure is then released by a manual valve, and the hydraulic line disconnected so that the spacer block can be removed and the defective pistons removed from the caliper assembly. The defective piston, or pistons, are replaced by operable ones, and the vacuum line used to drawn them into their bores, after which the caliper assembly is prefilled with hydraulic fluid and pressure tested prior to reinstallation in the vehicle.

5 Claims, 4 Drawing Figures

PATENTED APR 11 1972
3,654,689
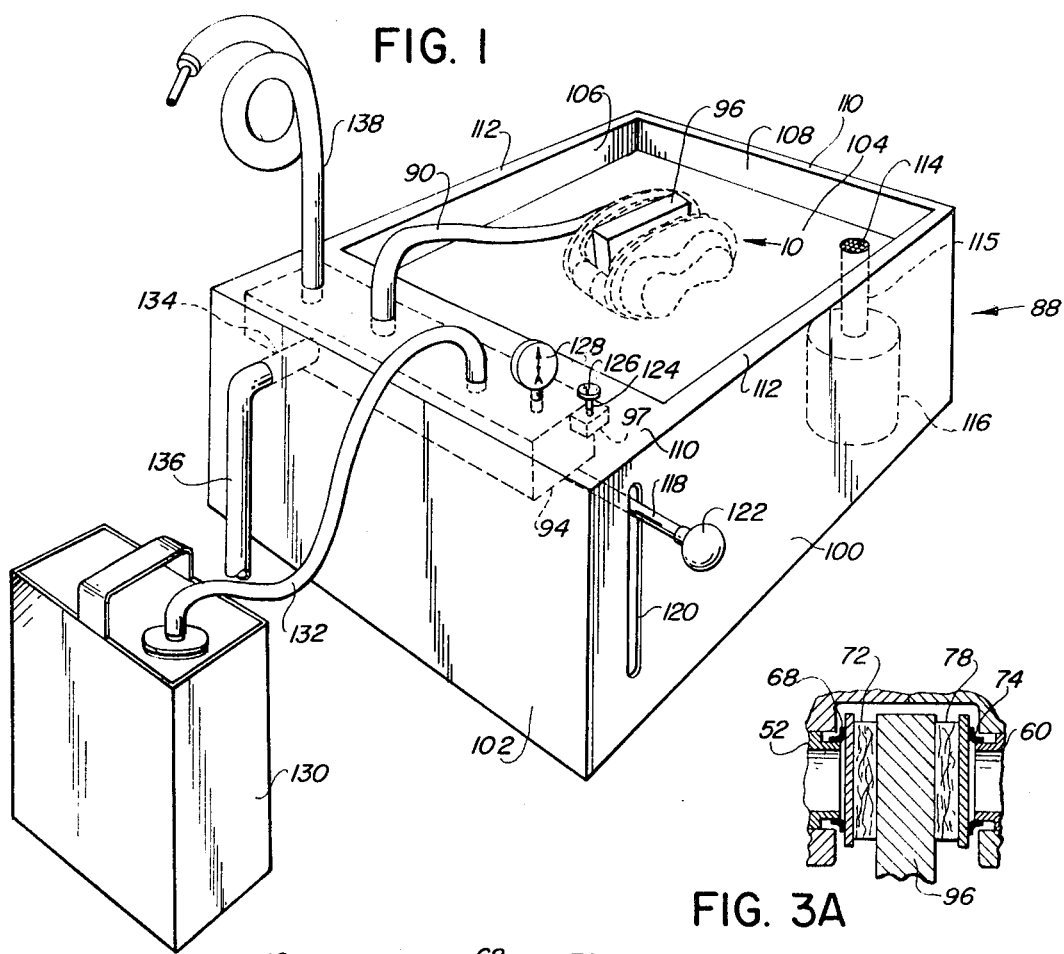
FIG. 1
FIG. 3A
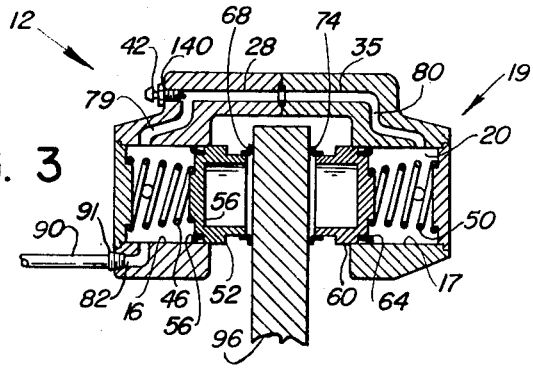
FIG. 3
*INVENTOR.*
MAURICE L. SCHWARZ
BY
*McCormick, Paulding & Huber*
ATTORNEYS

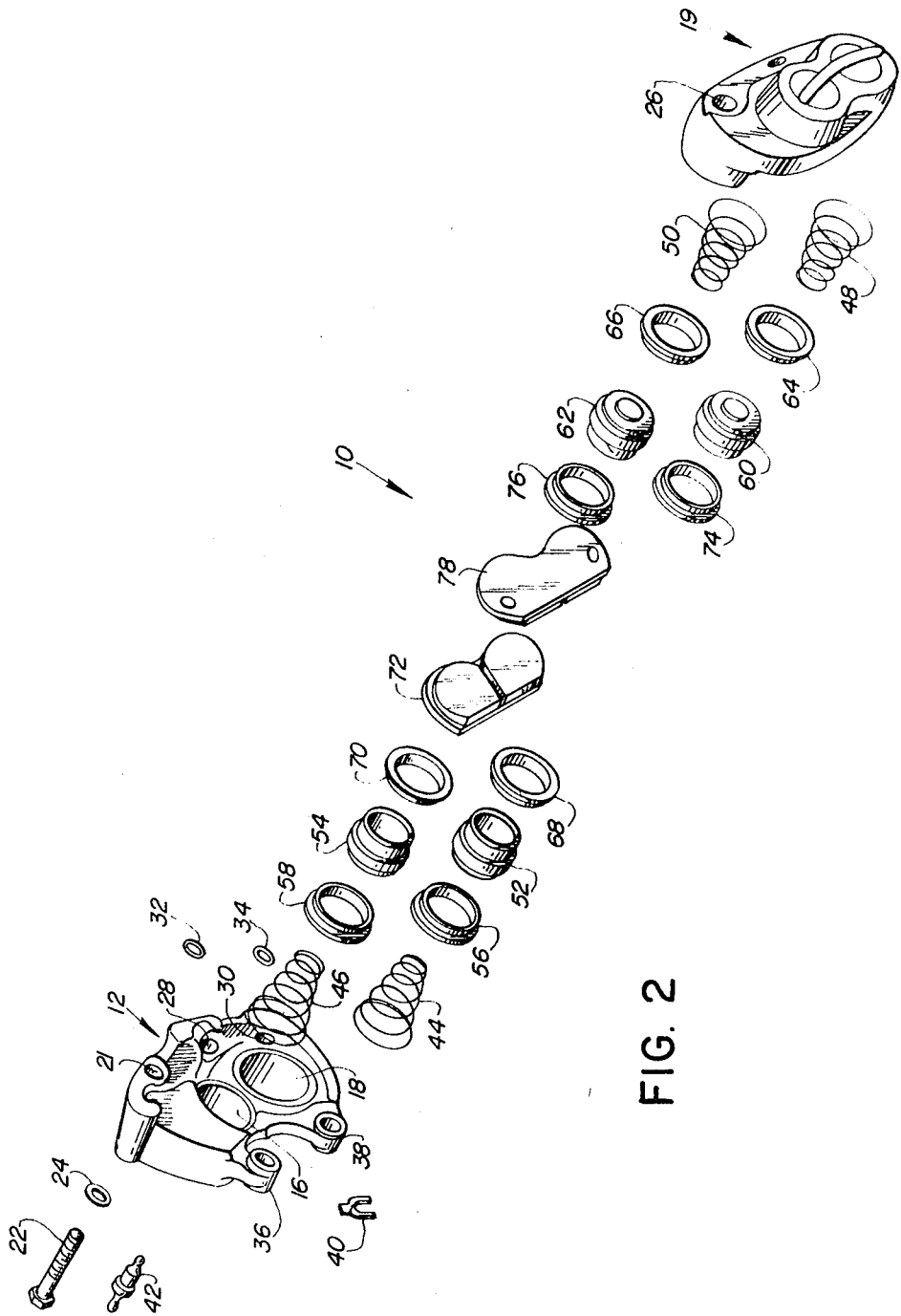

METHOD AND APPARATUS OF ASSEMBLING AND DISASSEMBLING HYDRAULIC DISC BRAKE CALIPERS

BACKGROUND OF THE INVENTION

This invention relates to automotive type disc brake assemblies, and deals more particularly with a method for removing frozen pistons from the caliper subassembly thereof.

Disc brake assemblies usually include a rotor disc mounted on the axle of the automobile and a stationary caliper subassembly with pistons slidably received in bores defined therein for hydraulic operation of brake pads which engage the rotor on the axle to prevent rotation thereof. The hydraulic pistons in the caliper subassembly are normally actuated by hydraulic pressure created by the operator of the automobile when he steps on the brake pedal or sometimes by a booster system to provide the necessary pressure at the caliper. When the brake pedal is released, the pistons are depressurized releasing the rotor for rotational movement. As a result of infrequent use, a hydraulic piston may become stuck or frozen in its bore such that it does not move under the limited hydraulic pressure applied through the brake pedal. More particularly, in a caliper having two hydraulic pistons on each side, if one piston is frozen and the other is not, the brake pad will be cocked as it is moved toward the rotor assembly, allowing some braking action but precluding a safe stop at normal speeds. The cocked brake pad then engages the rotor assembly resulting in uneven wear of the brake pad, requiring premature replacement. At the present time, these brake pads frequently need replacement and when the caliper is removed from the vehicle the frozen piston must be released by mechanical means. This has proved to be a bothersome and time consuming process which results in scoring of the bores in the caliper units. One aim of the present invention is to provide a convenient method and apparatus for easily and quickly removing and replacing frozen pistons in a disc brake type caliper assembly.

In addition, when new pistons are inserted in the bores of a disc brake caliper assembly they are inserted manually into the openings. It is a difficult operation to properly align these pistons manually with their associated seals and with the bore itself. Improper alignment may result in damaged seals. Accordingly, another object of the invention is to provide a simple and efficient method for drawing the hydraulic pistons into the cylindrical bores of the caliper assembly in such a manner as to maintain proper alignment between these components.

SUMMARY OF THE INVENTION

In accordance with the present invention a method is provided for releasing frozen pistons from a disc brake caliper assembly. The caliper assembly is removed from its position in the vehicle, the brake pads and boots removed, and the caliper assembly positioned on a work table. A spacer block is placed between the opposing pistons, and hydraulic pressure applied through a hydraulic system in the work table so that the frozen pistons are forced out of their bores. The hydraulic pressure is then released by means of a manual release valve so that the spacer block can be removed from between the pistons and any frozen hydraulic pistons removed for replacement or repair. A vacuum line in the work table is connected to the hydraulic system and new hydraulic pistons with their seals are drawn into their respective bores by vacuum suction. The hydraulic system is then used to fill the caliper assembly with fluid, and the assembly can then be pressure checked and mounted on the vehicle.

BRIEF DESCRIPTION OF THE DRAWINGS

FIG. 1 is a perspective view of an apparatus capable of carrying out the method of the present invention on a caliper assembly as shown in phantom lines.

FIG. 2 is an exploded perspective view of the parts in a typical disc brake caliper assembly.

FIG. 3 is a sectional view showing two horizontally opposed hydraulic pistons in a caliper assembly, and from which the brake pads have been removed to allow the pistons to be moved against a spacer block of predetermined thickness.

FIG. 3A is a view similar to FIG. 3 but showing one configuration for pressure checking the caliper assembly prior to reinstalling it in a vehicle.

DETAILED DESCRIPTION OF THE PREFERRED EMBODIMENT

The apparatus and method described herein relates to service equipment for disc brake caliper assemblies having one or more hydraulic pistons which normally move brake pads into engagement with a rotor assembly on the axle of a motor vehicle. Although the disc brake caliper assembly shown and described utilizes four hydraulic pistons, it will be understood that the apparatus and method will also apply when there are only one or two hydraulic pistons in the assembly.

A typical disc brake caliper assembly is indicated generally at 10 in FIG. 2 and comprises a caliper casting 12 having cylindrical bores 16, 18 therein for slidably receiving pistons 52 and 54 respectively. An opposed casting 19 is a mirror image of the casting 12 and has a first bore 20, more clearly seen in FIG. 3, and a second bore (not shown) slidably receiving the hydraulic pistons 60 and 62. The casting 12 has several openings at its upper end as shown at 21 through which pass bridge bolts 22 with associated washers 24. The bridge bolt 22 also passes through an aligned opening 26 in the casting 19 so as to clamp it to the casting 12. When so connected, hydraulic fluid passageways 28 and 30 in casting 12 communicate with passageways in casting 19 and are sealed between the castings by O rings 32 and 34.

The caliper casting 12 has two projecting ears 36 and 38 formed integrally therewith each of which have an opening to receive a mounting bolt for mounting the caliper assembly on a vehicle. Shims, such as the shim shown at 40, may be positioned on the mounting bolt so that the caliper assembly can be accurately positioned in a vertical plane with respect to the rotor disc (not shown) which is mounted on a spindle carrying a wheel of the vehicle to be braked.

A bleeder port screw 42 is threadably received in a rear opening of caliper casting 12 so as to normally close off the rear end of the passageway 28 to permit pressurization of both bores 16 and 20 for simultaneous movement of both pistons. Loosening of the bleeder port screw permits the caliper assembly to be filled in a manner to be described hereinbelow for bleeding air therefrom. Piston springs 44 and 46 are positioned in the cylindrical bores 16 and 18 of the caliper casting 12 with identical springs 48 and 50 positioned in similar bores in the other caliper casting 19. Piston seals 56 and 58 are provided on each piston to provide a fluid tight seal in bores 16 and 18 for hydraulic movement of the pistons in the braking direction. The pistons 52 and 54 carry boots 68 and 70 respectively, which are normally attached to the caliper 12 to provide a dirt and moisture seal. Likewise piston boots 74, 76 are mounted on pistons 60, 62.

Hydraulic fluid from the hydraulic system of the automobile (not shown) sometimes increased by a booster system linked to the brake pedal, normally passes through a line (not shown) into the passageway 82 to the bore 16 and thence through the crossover passageway 28 to the bore 20 to operate the pistons shown in FIG. 3. The other two pistons are simultaneously operated through passageways (not shown). Thus, when hydraulic fluid is forced into the caliper assembly, it will pass into cylindrical bores 16 and 18 forcing the pistons 56 and 54 to move slightly in their respective bores and cause brake pad 72 to engage one side of the rotor (not shown). Fluid will also flow through channels 79, 28, 35, 80 into cylindrical bore 20 and the lower bore causing pistons 60, 62 to move slightly in their bores causing the other brake pad 78 to engage the opposite side of the rotor. When hydraulic pressure is released, the fluid flows back through the line into the master brake cylinder relieving the hydraulic pressure on pads 72 and 78.

Turning next to a brief description of the apparatus for servicing the above-described caliper assembly, FIG. 1 shows a unit 10 to be serviced on a preferred embodiment 88. This apparatus 88 includes a self-contained hydraulic system comprising a manifold 94 which includes a conventional hand pump 118 for drawing fluid from a reservoir 130 through a line 132 to the manifold 94. A hydraulic pressure line 90 is connected to the manifold 94 and may be connected to the caliper assembly by a fitting 91 as shown in FIG. 3. A conventional hydraulic pressure gage 128 indicates the hydraulic pressure in the manifold 94, and hence in the caliper assembly as well when the line 90 is connected thereto as described above. A manual pressure release valve 97 is also provided on the manifold 94 to release system pressure, preferably by venting the manifold to a drain can 116 by a line (not shown). Thus, FIG. 1 shows a work table 88 which includes a self-contained hydraulic system requiring only a source of hydraulic fluid in the reservoir 130 to provide a bench set-up for pressure checking caliper assemblies or the like.

Looking at the work table 88 in greater detail, it comprises two longitudinal sides 100 and two transverse sides 102. A drain pan 104 is spaced downwardly below the top of the table 88 by depending longitudinal and depending sides 106 and transverse sides 108. Top transverse strips 110, 110 and longitudinal top strips 112, 112 complete the sheet metal pan which is provided to receive excess hydraulic fluid that may be spilled when the disc brake caliper assembly is subjected to the method disclosed. A drain hole 114 is provided in the pan 104 so that the excess fluid flows from the pan 104 through drain pipe 115 into a receptacle 116 located beneath the drain hold and shown in broken lines. The hydraulic pump 118 is of conventional construction, and has a handle which passes through a slot 120 in side wall 100. The handle 118 has a knob portion 122 thereon so that the handle can be manually grasped and by oscillating the handle up and down the hydraulic pressure applied by the pump can be increased.

A vacuum line 138 is also provided on the work table 88, and a venturi 134 is provided with shop air through the line 136 to give the necessary suction to vacuum line 138. Exhaust air from the shop air line 136 is vented to the atmosphere.

In accordance with one presently preferred method of carrying out the present invention with the apparatus described above, the disc brake caliper assembly 10, having one or more defective or frozen pistons, is removed from the motor vehicle and placed on the drain pan 104. The brake pads 72 and 76 are removed and a spacer block 96 of predetermined thickness is placed between the opposed pairs of pistons 52, 54 and 60, 62. As best shown in FIG. 3, and after first connecting the pressure line 90 to the port 82 of the caliper assembly, the hand pump 118 can then be manually operated to pressurize the hydraulic manifold 94 as described above. The thickness of the spacer block 96 is such that the pistons 52 and 60 move toward one another to disengage their associated boots 68 and 74 from the castings 12 and 19 and to allow these pistons to travel to the limit position shown in FIG. 3. Thus, the spacer block thickness is dictated by the piston displacement required for maximum travel, limited only by the piston seals 56 and 64 being able to maintain pressure in their associated bores 16 and 17 respectively. In reaching these piston limiting positions, wherein each piston abuts the spacer block 96, the operator can manually apply whatever hydraulic pressure is required to move all four pistons to the positions shown in FIG. 3. Some pistons will move out with very little pressure applied, but a frozen piston may require considerably more pressure to free it.

A visual check can be made of the pistons during this phase of the procedure, and a visual check can be kept on the pressure by means of pressure gage 128 to see that some upper limit is not exceeded. Since a considerable pressure can be attained, all the pistons will eventually be forced to move into contact with the spacer block 96, assuring that all frozen pistons are freed. The manual release valve 97 can then be opened by means of knob 126 and the hydraulic fluid pressure released, the excess fluid being drained into the can 116. The pressure line 90 is then disengaged from the brake disc caliper assembly and the excess hydraulic fluid drained out so that the defective pistons and seals may be removed to be repaired or replaced by operable ones.

To reassemble the brake disc caliper assembly, the castings 12 and 14 are connected together by means of bridge bolts 22, if these bolts have been removed to facilitate disassembly. Then the vacuum line 138 is attached to the pressure port 82 and the springs 44, 46 are connected to pistons 52 and 54 and the pistons together with their seals 56, 58 thereon are placed adjacent the associated bores 16, 18. Vacuum suction is then applied to the caliper assembly to draw the pistons and their associated parts into these bores. This procedure prevents misalignment of the pistons with respect to their bores and prevents possible damage to the seals. The vacuum line is then disengaged from port 82 and the pressure line 90 reconnected. The release valve is then closed and bleeder screw 42 opened slightly to permit the operator to pressurize the manifold 94 by means of the hand pump 118 and to bleed the air from the caliper and replace it with hydraulic fluid. During this pressurization step, the spacer block 96 may be used with the brake pads 72 and 76 in place as shown in FIG. 3A, or a combination of spacer block 96 plus shimming means equivalent in thickness to the two brake pads may be used to provide a reaction member against which the pistons can act to permit pressurizing the caliper unit, and upon closing of the bleeder screw 42 the pressure can be increased to permit a pressure check to be made of the caliper unit. This check entails observing the caliper unit for leaks and/or indication of a drop in hydraulic pressure on the gage 128. After such a check has been made, the operator opens the pressure release valve 97 to bleed off this pressure and disconnects the pressure line 90 from port 82.

The brake caliper assembly having been tested is now ready to be mounted on the axle of an automobile. It should also be noted that the unit is now prefilled or charged with hydraulic fluid simplifying the charging and bleeding normally required when the vehicular hydraulic system is serviced prior to putting the vehicle into operation.

I claim:

1. Apparatus for removing frozen pistons from an automotive type disc brake caliper assembly which includes at least one piston in a bore, said apparatus comprising a work table, a source of hydraulic fluid, a hydraulic manifold, manually operated pump means for pressurizing said manifold, a pressure line for pressurizing the caliper assembly from said manifold, a pressure release valve in said manifold, and a spacer block for use with said caliper assembly to provide a reaction member against which a piston can act, said spacer block having a thickness such that the piston must move through a displacement considerably greater than required when the caliper assembly is in use on a vehicle but less than the displacement required to cause a loss in pressure in the piston bore.

2. Apparatus according to claim 1 further characterized by a vacuum source of air pressure associated with said work table, a vacuum line connectible with said caliper assembly for evacuating trapped air therein, and for use in reassembling the pistons in their associated bores so that the pistons are properly aligned therein during said reassembly.

3. A method for releasing frozen pistons from an automotive type disc brake caliper assembly which includes at least one piston mounted in a bore for engaging an associated brake pad, said method comprising placing the caliper assembly on a work table which includes a self-contained hydraulic system, removing the brake pads, placing a spacer block in the space formerly occupied by said brake pads, connecting the caliper assembly to said hydraulic system, applying hydraulic pressure to the hydraulic system by a manual pump to cause the piston to travel through a displacement considerably greater than that possible when the caliper assembly is installed in the vehicle, said piston travel being limited only by engagement with the spacer block, which block is thin enough to achieve said displacement but thick enough so as to preclude loss of hydraulic system pressure due to fluid leakage between the piston and the piston bore.

4. The method according to claim 3 further characterized by the successive steps of depressurizing the hydraulic system following the procedure outlined in claim 3, removing the now unfrozen piston and the spacer block, removing the pressure line and allowing the fluid in the caliper assembly to drain onto the work table, connecting the caliper to a vacuum pressure source, and placing a piston together with its associated seals and other component parts adjacent each of the bores in the caliper assembly so that each piston is drawn into its associated bore by suction supplied by said vacuum pressure source.

5. The method according to claim 4 further characterized by the steps of disconnecting the vacuum line following the completion of the procedure outlined in claim 4, connecting the caliper assembly to said hydraulic system, placing said spacer block in the space defined above and adding shimming means to said spacer block to increase the effective thickness thereof and reduce the possible displacement of the piston, applying hydraulic pressure to the hydraulic system to cause the piston to travel through a displacement substantially equal to that possible when the caliper assembly is installed in the vehicle, continuing to apply pressure by said hand pump to a predetermined test pressure, inspecting the caliper assembly for leaks, and check the pressure gage for loss of system pressure.

* * * * *

PO-1050
(5/69)

UNITED STATES PATENT OFFICE
CERTIFICATE OF CORRECTION

Patent No. 3,654,689      Dated April 11, 1972

Inventor(s) Maurice L. Schwarz

It is certified that error appears in the above-identified patent and that said Letters Patent are hereby corrected as shown below:

In the Abstract, Line 15, "drawn" should be "draw".

Col. 3, line 27, "hold" should be "hole".

Signed and sealed this 5th day of September.

(SEAL)
Attest:

EDWARD M. FLETCHER, JR.
Attesting Officer

ROBERT GOTTSCHALK
Commissioner of Patents